United States Patent [19]
Miyanabe et al.

[11] Patent Number: 6,163,518
[45] Date of Patent: Dec. 19, 2000

[54] CROSSTALK ELIMINATING METHOD FOR USE IN A RECORDED INFORMATION REPRODUCING APPARATUS

[75] Inventors: Shogo Miyanabe; Hiroki Kuribayashi, both of Tsurugashima, Japan

[73] Assignee: Pioneer Electronic Corporation, Tokyo, Japan

[21] Appl. No.: 09/188,936

[22] Filed: Nov. 10, 1998

[30] Foreign Application Priority Data

Nov. 11, 1997 [JP] Japan .................................. 9-308411

[51] Int. Cl.[7] .................................................. G11B 7/00
[52] U.S. Cl. .................................... 369/124.02; 369/48
[58] Field of Search ................... 369/44.32, 47, 369/48, 49, 54, 58, 60.01, 124.01, 124.02, 124.09

[56] References Cited

U.S. PATENT DOCUMENTS

5,153,872  10/1992  Maeda ................................. 369/124.09
5,729,514   3/1998  Horigome et al. ..................... 369/58
6,084,837   7/2000  Miyanabe et al. ................... 369/47 X

*Primary Examiner*—Paul W. Huber
*Attorney, Agent, or Firm*—Perman & Green, LLP

[57] ABSTRACT

A crosstalk eliminating method for use in a recorded information reproducing apparatus, which can eliminate crosstalks from the adjacent tracks of a recording track as a reading target even if a tilt occurs between a recording disk and a pickup. A reading position by the pickup for the center recording track among the three adjacent recording tracks is employed as a reference. Crosstalk components are obtained based on a read signal read out from each of the positions which are shifted by a predetermined distance frontward and rearward in the reading direction from the reading position on each of the recording tracks which are neighboring on both sides of the center recording track and a read signal read out from each position near the reading position on each of the recording tracks which are neighboring on both sides of the center recording track. The crosstalk components are subtracted from the read signal read out from the reading position on the center recording track, thereby eliminating the crosstalks from the adjacent tracks.

6 Claims, 7 Drawing Sheets

FIG. 10

CROSSTALK ELIMINATING METHOD FOR USE IN A RECORDED INFORMATION REPRODUCING APPARATUS

BACKGROUND OF THE INVENTION

1. Field of the Invention

The invention relates to a crosstalk eliminating method for use in a recorded information reproducing apparatus, for eliminating crosstalk components from adjacent tracks of a recording track on a recording medium from a read signal read out from the recording track.

2. Description of Related Art

As measures to record information data onto a recording disk as an optical recording medium at a high density, a method of reducing the lengths of pits representing the information data, a method of narrowing the pitch between the recording tracks, or the like are conceivable.

However, if the track pitch is narrowed, a problem arises such that crosstalks from the adjacent tracks are superimposed into the read signal read out from the recording disk by a pickup.

Figure 1:
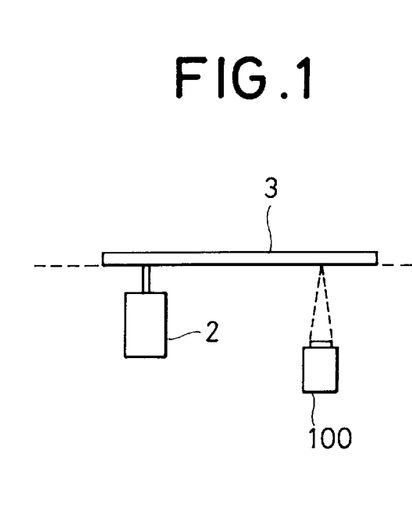
FIGS. 1 to 3 are diagrams showing tilt states between a recording disk and a pickup.
Figure 2:
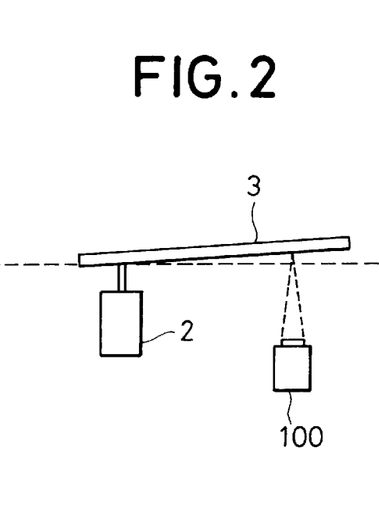
Figure 3:
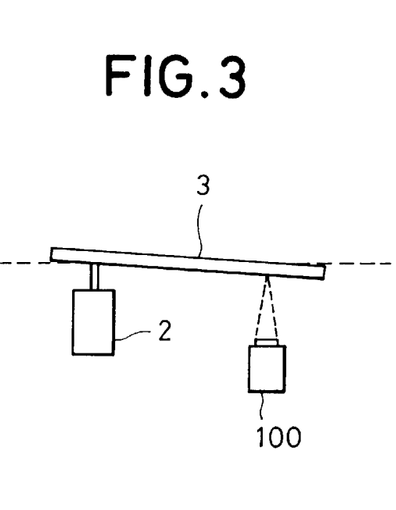

In this connection, the influence of the crosstalk varies between the case where a pickup 100 irradiates a reading beam at right angles to the recording surface of a recording disk 3 which is rotated by a spindle motor 2 as illustrated in FIG. 1, and the case where an inclination (hereinafter, referred to as a tilt) occurs between the recording disk 3 and pickup 100 as illustrated in FIGS. 2 and 3.

OBJECT AND SUMMARY OF THE INVENTION

It is, therefore, an object of the invention to provide a crosstalk eliminating method in a recorded information reproducing apparatus, in which even if there is a tilt between a recording disk and a pickup, crosstalks from adjacent tracks of a recording track as a reading target can effectively be removed.

According to the first aspect of the invention, there is provided a crosstalk eliminating method in a recorded information reproducing apparatus having a pickup to obtain a read signal by photoelectrically converting reflection light when a reading beam is irradiated onto recording tracks formed on a recording disk, comprising the steps of: employing a reading position by the pickup for the center recording track among the three adjacent recording tracks as a reference; obtaining crosstalk components based on a read signal read out from each of positions which are shifted frontward and rearward by a predetermined distance in the reading direction from the reading position on each of the recording tracks which are neighboring the center recording track on its both sides and a read signal read out from each position near the reading position on each of the recording tracks which are neighboring on both sides of the center recording track; and subtracting the crosstalk components from the read signal read out from the reading position on the center recording track, thereby eliminating the crosstalks from the adjacent tracks.

According to the second aspect of the invention, there is provided a crosstalk eliminating method in a recorded information reproducing apparatus having a pickup to obtain a read signal by photoelectrically converting reflection light when a reading beam is irradiated onto recording tracks formed on a recording disk, comprising the steps of: when a reading position by the pickup for the center recording track among the three adjacent recording tracks is employed as a reference and a crosstalk eliminated read signal in which crosstalk components from the adjacent tracks are eliminated from the read signal read out from the reading position is obtained; detecting an error value of a signal level in the crosstalk eliminated read signal; obtaining a correlation value between the error value and a first read signal read out from each position that is shifted by a predetermined distance ahead in the reading direction from the reading position on each of the recording tracks which are neighboring on both sides of the center recording track and multiplying the first read signal by the correlation value, thereby obtaining a first crosstalk component; obtaining a correlation value between the error value and a second read signal read out from each position near the reading position on each of the recording tracks which are neighboring on both sides of the center recording track and multiplying the second read signal by the correlation value, thereby obtaining a second crosstalk component; obtaining a correlation value between the error value and a third read signal read out from each position which is shifted by a predetermined distance on the rear side in the reading direction from the reading position on each of the recording tracks which are neighboring on both sides of the center recording track and multiplying the third read signal by the correlation value, thereby obtaining a third crosstalk component; and subtracting each of the first, second, and third crosstalk components from the read signal read out from the reading position on the center recording track, thereby obtaining the crosstalk eliminated read signal.

DETAILED DESCRIPTION OF THE PREFERRED EMBODIMENT

An embodiment of the invention will now be described below.

Figure 4:
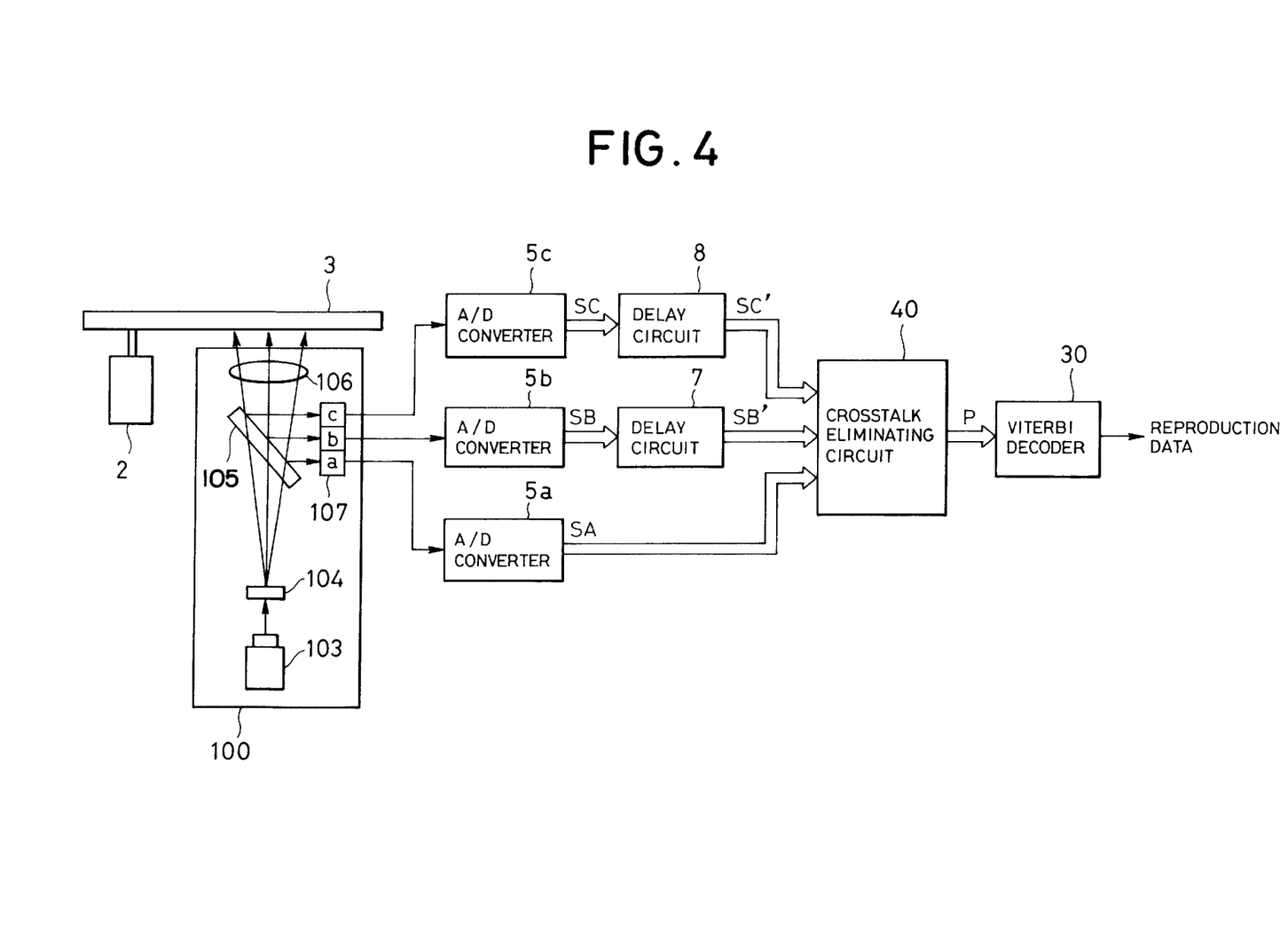
FIG. 4 is a diagram showing a construction of a recorded information reproducing apparatus having a crosstalk eliminating circuit for eliminating crosstalks from adjacent tracks by a crosstalk eliminating method according to the invention.

FIG. 4 is a diagram showing the construction of a recorded information reproducing apparatus having a crosstalk eliminating circuit for eliminating crosstalks from adjacent tracks in accordance with a crosstalk eliminating method according to the invention.

In FIG. 4, a laser beam emitted from a laser oscillator 103 mounted on the pickup 100 serving as information reading means is divided into three information reading beams through a grating 104. The three information reading beams are irradiated onto the recording disk 3 through a half mirror 105 and an objective lens 106. The three information reading beams are irradiated onto the three recording tracks which are neighboring on the recording surface of the recording disk 3, respectively.

Figure 5:
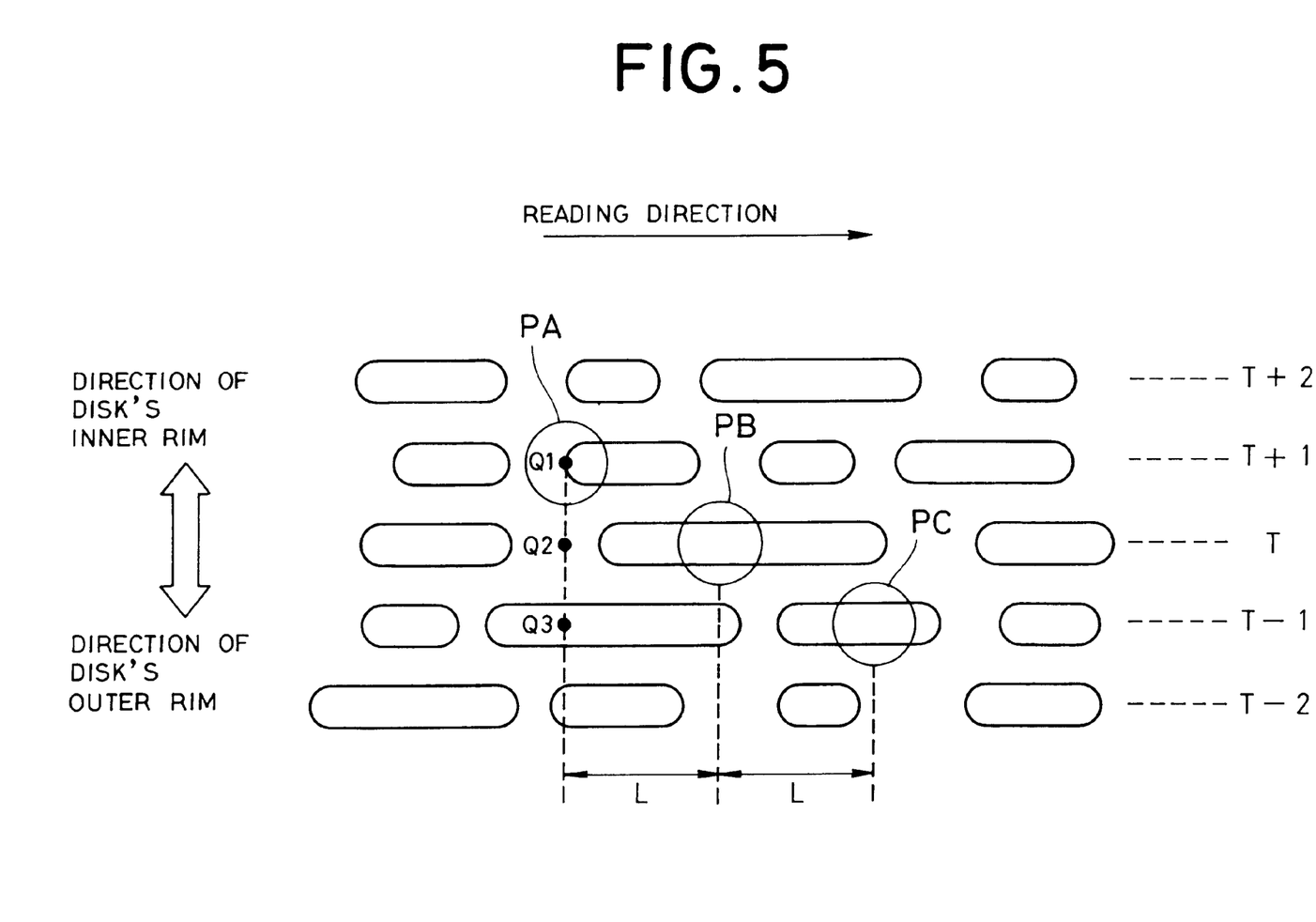
FIG. 5 is a diagram showing positional relations between each recording track on a recording disk 3 and each of beam spots PA to PC.

FIG. 5 is a diagram showing each beam spot formed on the recording surface of the recording disk 3 by the three information reading beams.

As shown in FIG. 5, when a center beam spot PB is formed on a track T, a beam spot PA is formed on its adjacent track (T+1). A beam spot PC is further formed on an adjacent track (T−1) of the track T.

The reflection light from each of the beam spots PA, PB, and PC is irradiated onto a photodetector 107 through the objective lens 106 and half mirror 105. The photodetector 107 comprises independent photodetectors 107a to 107c.

The photodetector 107a performs photoelectric conversion of the reflection light from the beam spot PA supplied through the half mirror 105 and supplies a resultant read signal to an A/D converter 5a. The photodetector 107b performs photoelectric conversion of the reflection light from the beam spot PB supplied through the half mirror 105 and supplies a resultant read signal to an A/D converter 5b. The photodetector 107c performs photoelectric conversion of the reflection light from the beam spot PC supplied through the half mirror 105 and supplies a resultant read signal to an A/D converter 5c.

As shown in FIG. 5, it is now assumed that the beam spots PA and PB are spaced apart from each other by a distance L in its reading direction and the beam spots PB and PC are also spaced apart from each other by the distance L.

Each of the A/D converters 5a to 5c sequentially samples the read signal supplied from each of the photodetectors 107a to 107c, thereby obtaining each of read sampling value sequence SA to SC.

A delay circuit 7 supplies a delayed read sampling value sequence SB' obtained by delaying the read sampling value sequence SB by (L/V) time to a crosstalk eliminating circuit 40. A delay circuit 8 supplies a delayed read sampling value sequence SC' obtained by delaying the read sampling value sequence SC by 2·(L/V) time to the crosstalk eliminating circuit 40. In this instance, the read sampling value sequence SA generated from the A/D converter 5a is directly supplied to the crosstalk eliminating circuit 40.

Each of the delay circuits 7 and 8 comprises, for instance, an FIFO (first in first out) memory or the like, sequentially fetches the supplied read sampling value sequence to registers of n stages every sampling timing in the A/D converter, and generates the read sampling value sequence while shifting it every timing of a predetermined reference clock signal, thereby giving the delay time as mentioned above to each of the read sampling value sequences SB and SC.

The reference letter "L" denotes the distance between the beam spots PB and PC (PA) as shown in FIG. 5 and "V" indicates a reading linear velocity by the pickup 100 for the recording disk 3.

That is, as shown in FIG. 5, in the case where one read sampling value in the read sampling value sequence SA is read out from a position $Q_1$ on the recording track (T+1), one read sampling value in the delayed read sampling value sequence SB' is read out from a position $Q_2$ on the recording track T. In this instance, one read sampling value in the delayed read sampling value sequence SC' is read out from a position $Q_3$ on the recording track (T−1). As shown in FIG. 5, the positions $Q_1$ to $Q_3$ exist on the same radial line on the recording disk 3.

That is, the read sampling value sequences (SA, SB', SC') of three systems read out from the positions existing on the same radial line on the three adjacent recording tracks are supplied to the crosstalk eliminating circuit 40.

On the basis of the read sampling value sequence SA and delayed read sampling value sequences SB' and SC', the crosstalk eliminating circuit 40 obtains a crosstalk eliminated read sampling value sequence P in which the crosstalk component from each of the adjacent tracks {recording tracks (T+1) and (T−1)} superimposed in the delayed read sampling value sequence SB' is removed.

A Viterbi decoder 30 captures the crosstalk eliminated read sampling value sequence P as a continuous time series, obtains maximum likelihood binary reproduction data based on this time series, and outputs the obtained data.

Figure 6:
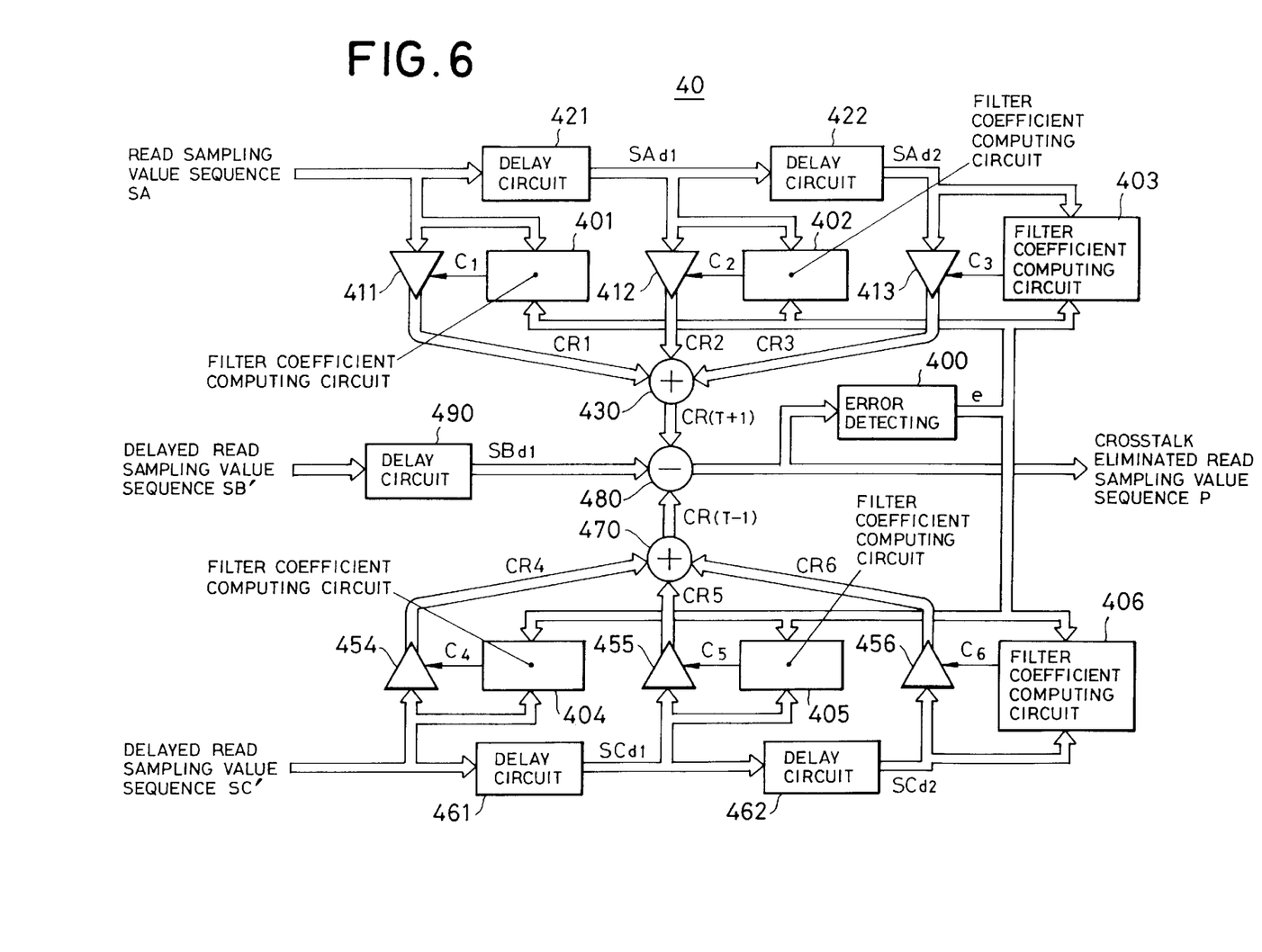
FIG. 6 is a diagram showing an example of an internal construction of a crosstalk eliminating circuit 40 according to the invention.

FIG. 6 is a diagram showing an internal construction of the crosstalk eliminating circuit 40 for eliminating the crosstalks from the adjacent tracks by the crosstalk eliminating method according to the invention.

The crosstalk eliminating circuit 40 shown in FIG. 6 obtains the read sampling value sequence P in which the crosstalks are removed by performing an adaptive signal process based on an adaptive algorithm like, for example, an LMS (Least Mean Square) algorithm to each of the read sampling value sequences read out from the three recording tracks (T+1), T, and (T−1) formed adjacently on the recording disk 3.

In FIG. 6, a filter coefficient computing circuit 401 obtains a filter coefficient $C_1$ based on the read sampling value sequence SA and an error value e supplied from an error detecting circuit 400 and supplies $C_1$ to a coefficient multiplier 411. The coefficient multiplier 411 multiplies each read sampling value in the read sampling value sequence SA by the filter coefficient $C_1$, sets a multiplication result to a crosstalk CR1, and supplies it to an adder 430. A delay circuit 421 delays the read sampling value sequence SA by a predetermined time t (which will be explained hereinafter) and supplies the delayed sequence as a delayed read sampling value sequence $SA_{d1}$ to a filter coefficient computing circuit 402, a coefficient multiplier 412, and a delay circuit 422. The filter coefficient computing circuit 402 obtains a filter coefficient $C_2$ based on the delayed read sampling value sequence $SA_{d1}$ and the error value e supplied from the error detecting circuit 400 and supplies $C_2$ to a coefficient multiplier 412. The coefficient multiplier 412 multiplies each read sampling value in the delayed read sampling value sequence $SA_{d1}$ by the filter coefficient $C_2$, sets a multiplication result to a crosstalk CR2, and supplies it to the adder 430. The delay circuit 422 further delays the delayed read sampling value sequence $SA_{d1}$ by the predetermined time t and supplies the delayed sequence as a delayed read sampling value sequence $SA_{d2}$ to a filter coefficient computing circuit 403 and a coefficient multiplier 413. The filter coefficient computing circuit 403 obtains a filter coefficient $C_3$ based on the delayed read sampling value sequence $SA_{d2}$ and the error value e supplied from the error detecting circuit 400 and supplies $C_3$ to a coefficient multiplier 413. The coefficient multiplier 413 multiplies each read sampling value in the delayed read sampling value sequence $SA_{d2}$ by the filter coefficient $C_3$, sets a multiplication result to a crosstalk CR3, and supplies it to the adder 430. The adder 430 sets a resultant value obtained by adding the crosstalks CR1 to CR3 to a total crosstalk $CR_{(T+1)}$ of the recording tracks (T+1) to T as shown in FIG. 5 and supplies it to a subtractor 480.

A filter coefficient computing circuit 404 obtains a filter coefficient $C_4$ based on the delayed read sampling value sequence SC' and the error value e supplied from the error detecting circuit 400 and supplies $C_4$ to a coefficient multiplier 454. The coefficient multiplier 454 multiplies each read sampling value in the delayed read sampling value sequence SC' by the filter coefficient $C_4$, sets a multiplication result to a crosstalk CR4, and supplies it to an adder 470. A delay circuit 461 delays the delayed read sampling value sequence SC' by the predetermined time t and supplies the delayed sequence as a delayed read sampling value sequence $SC_{d1}$ to a filter coefficient computing circuit 405, a coefficient multiplier 455, and a delay circuit 462. The filter coefficient computing circuit 405 obtains a filter coefficient $C_5$ based on the delayed read sampling value sequence $SC_{d1}$ and the error value e supplied from the error detecting circuit 400 and supplies $C_5$ to the coefficient multiplier 455. The coefficient multiplier 455 multiplies each read sampling value in the delayed read sampling value sequence $SC_{d1}$ by the filter coefficient $C_5$, sets a multiplication result to a crosstalk CR5, and supplies it to the adder 470. The delay circuit 462 further delays the delayed read sampling value sequence $SC_{d1}$ by the predetermined time t and supplies the delayed sequence as a delayed read sampling value sequence $SC_{d2}$ to a filter coefficient computing circuit 406 and a coefficient multiplier 456. The filter coefficient computing circuit 406 obtains a filter coefficient $C_6$ based on the delayed read sampling value sequence $SC_{d2}$ and the error value e supplied from the error detecting circuit 400 and supplies $C_6$ to the coefficient multiplier 456. The coefficient multiplier 456 multiplies each read sampling value in the delayed read sampling value sequence $SC_{d2}$ by the filter coefficient $C_6$, sets a multiplication result to a crosstalk CR6, and supplies it to the adder 470. The adder 470 sets a resultant value obtained by adding the crosstalks CR4 to CR6 to a total crosstalk $CR_{(T-1)}$ of the recording tracks (T-1) to T as shown in FIG. 5 and supplies it to the subtractor 480.

A delay circuit 490 further delays the delayed read sampling value sequence SB' by the predetermined time t and supplies the delayed sequence as a delayed read sampling value sequence $SB_{d1}$ to the subtractor 480. The subtractor 480 subtracts each of the total crosstalks $CR_{(T+1)}$ and $CR_{(T-1)}$ from the delayed read sampling value sequence $SB_{d1}$ and generates a subtraction result as a crosstalk eliminated read sampling value sequence P.

The error detecting circuit 400 detects a difference between each read sampling value in the crosstalk eliminated read sampling value sequence P and each ideal sampling value which can be used as each of those read sampling values and supplies it as an error value e as mentioned above to each of the filter coefficient computing circuits 401 to 406. For example, among the three continuous read sampling value sequence in the crosstalk eliminated read sampling value sequence P, the error detecting circuit 400 extracts the center sample, namely, a zero-cross sample when the value is shifted from positive to negative or from negative to positive. An error between the zero-cross sample and the actual "0" value is labelled as an error value e. In this instance, the filter coefficient computing circuits 401 to 406 update the filter coefficients $C_1$ to $C_6$ in a manner such that the error value e is converged to "0".

Figure 7:
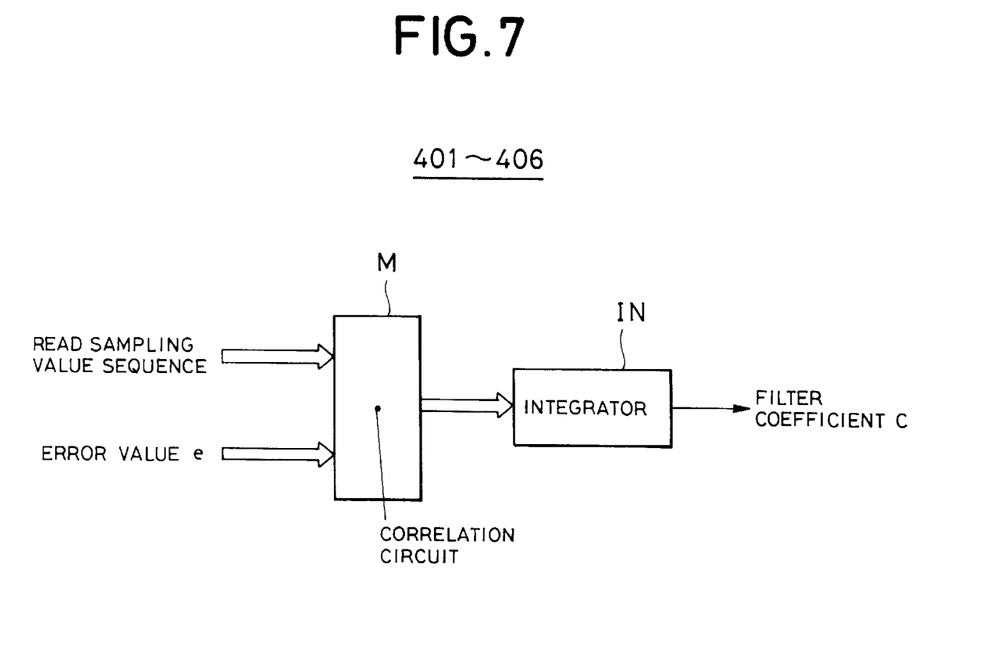
FIG. 7 is a diagram showing an example of an internal construction of filter coefficient computing circuits 401 to 406.

Each of the filter coefficient computing circuits 401 to 406 has the same internal construction and it is shown in FIG. 7.

In FIG. 7, a correlation arithmetic operating circuit M obtains a correlation between the read sampling value sequence SA or the delayed read sampling value sequences $SA_{d1}$, $SA_{d2}$, SC', $SC_{d1}$, or $SC_{d2}$ and the error value e and supplies a correlation value corresponding to the correlation to an integrator IN. For example, the correlation arithmetic operating circuit M obtains a correlation value corresponding to both correlations by multiplying the read sampling value sequence and the error value e. The integrator IN integrates the correlation value and generates an integration result as a filter coefficient C.

For example, the filter coefficient computing circuit 401 in FIG. 6 obtains a correlation between the read sampling value sequence SA and the error value e and generates a value obtained by integrating a correlation value corresponding to the correlation and averaging an integration result as a filter coefficient $C_1$.

The function by the operation of the crosstalk eliminating circuit 40 shown in FIG. 4 will now be described with reference to FIGS. 8 to 10.

Figure 8:
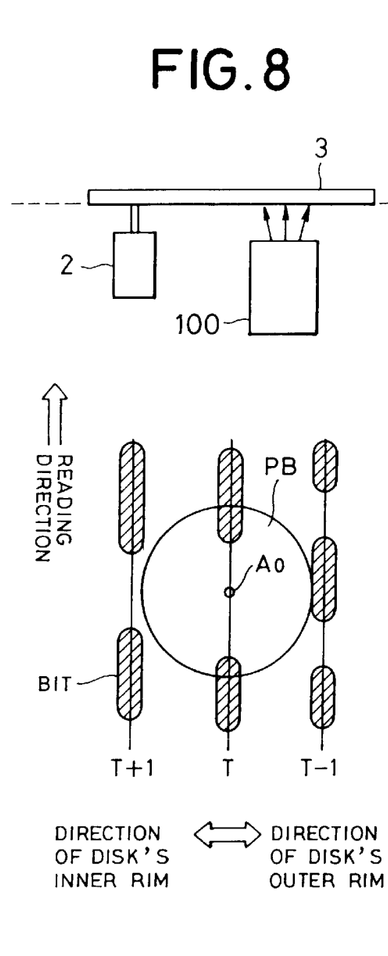
FIGS. 8 to 10 are diagrams showing correspondence relations among the tilt between the pickup 100 and recording disk 3 and beam spot shapes which are formed on the recording surface of the recording disk 3.

First, FIG. 8 is a diagram showing the shape of the beam spot PB which is formed by irradiating the information reading beam from the pickup 100 to a position $A_0$ on the recording track T in the case where no tilt occurs between the pickup 100 and the recording surface of the recording disk 3.

As shown in FIG. 8, when no tilt occurs between the pickup 100 and the recording surface of the recording disk 3, the beam spot PB which is almost a complete circle is formed around the position $A_0$ on the recording track T as a center.

Figure 9:
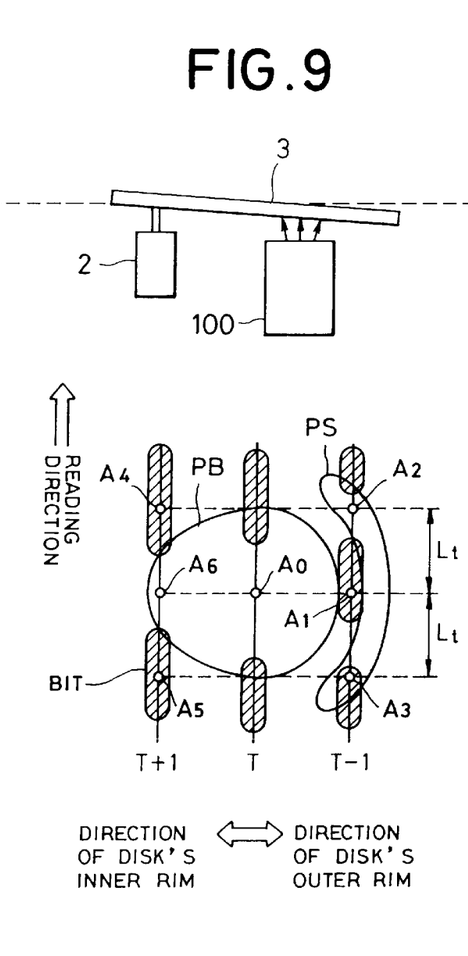

When a tilt as shown in FIG. 9 occurs between the pickup 100 and the recording surface of the recording disk 3, as shown in FIG. 9, the beam spot PB has a shape which extends on the disk' inner rim side. In this instance, the beam spot PB irradiates a part on the recording track (T+1) which is neighboring on the disk's inner rim side of the recording track T, for example, a position $A_6$ just beside a position $A_1$ on the recording track T. Further, a side lobe PS is formed at a position on the disk's outer rim side relative the recording track T. In this state, the side lobe PS irradiates two positions $A_2$ and $A_3$ which are shifted by the following distance $L_t$ frontward and rearward respectivey in the reading direction from the position $A_0$ on a recording track (T-1) that is neighboring the recording track T on the disk's outer rim side:

$$\{(0.65\times\lambda/NA)^2-Tp^2\}^{1/2} < L_t < \{(\lambda/NA)^2-Tp^2\}^{1/2}$$

where, λ is a wavelength of reading beam, and NA is a numerical aperture of the objective lens 106, Tp is a pitch between the recording tracks.

Therefore, when the tilt as shown in FIG. 9 occurs between the pickup 100 and the recording surface of the recording disk 3, the crosstalks from the position $A_6$ on the recording track (T+1) which is adjacent to the recording track T on the disk's inner rim side and the positions $A_2$ and $A_3$ on the recording track (T-1) which is adjacent to the recording track T on the disk's outer rim side are superimposed in the read sampling value sequence SB obtained when the pickup 100 reads the recorded information from the position $A_0$ on the recording track T.

Figure 10:
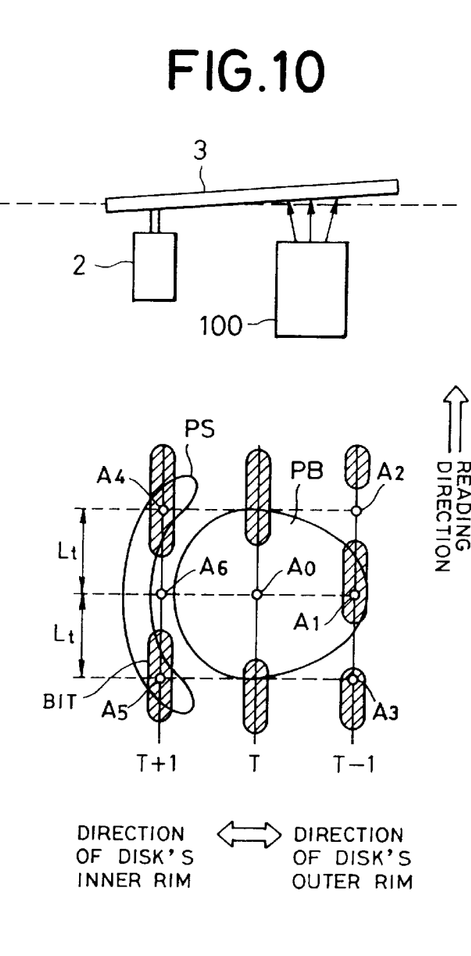

When a tilt as shown in FIG. 10 exists between the pickup 100 and the recording surface of the recording disk 3, as shown in FIG. 10, the beam spot PB has a shape which extends on the disk's outer rim side. In this instance, the beam spot PB irradiates a part on the recording track (T-1) which is neighboring on the disk's outer rim side of the recording track T, for example, a position $A_1$ just beside a position $A_0$ on the recording track T. Further, a side lobe PS is formed on the disk's inner rim side rather than the recording track T. At this time, the side lobe PS irradiates positions $A_4$ and $A_5$ which are shifted by the following distance $L_t$ frontward and rearward in the reading direction from the position $A_0$ on the recording track (T+1) that is neighboring the recording track T on the disk's inner rim side:

$$\{(0.65 \times \lambda/NA)^2 - Tp^2\}^{1/2} < L_t < \{(\lambda/NA)^2 - Tp^2\}^{1/2}$$

where, $\lambda$ is a wavelength of reading beam, NA is a numerical aperture of the objective lens 106, and Tp is a pitch between the recording tracks.

Therefore, when the tilt as shown in FIG. 10 occurs between the pickup 100 and the recording surface of the recording disk 3, the crosstalks from the position $A_1$ on the recording track (T−1) which is adjacent to the recording track T on the disk's outer rim side and the positions $A_4$ and $A_5$ on the recording track (T+1) which is adjacent to the recording track T on the disk's inner rim side are superimposed in the read sampling value sequence SB obtained when the pickup 100 reads the recorded information from the position $A_0$ on the recording track T.

As mentioned above, when there is the tilt between the pickup 100 and the recording disk 3, the crosstalks from the positions ($A_4$ and $A_5$, or $A_2$ and $A_3$) which are shifted by the distance $L_t$ on the frontward and rearward respectively in the reading direction from the position $A_0$ on the recording track (T+1) or (T−1) which is adjacent to the recording track T are superimposed into the read signal read out from the position $A_0$ on the recording track T.

In the crosstalk eliminating circuit 40 shown in FIG. 6, therefore, the crosstalk component from each of the positions $A_5$, $A_6$, and $A_4$ on the recording track (T+1) shown in FIGS. 8 to 10 and the crosstalk component from each of the positions $A_3$, $A_1$, and $A_2$ on the recording track (T−1) are obtained. By subtracting each of the crosstalk components from the read sampling value read out from the position $A_0$ on the recording track T, the read sampling value sequence in which the crosstalks are removed is obtained.

That is, the predetermined time t as a delay time of each of the delay circuits 421, 422, 461, 462, and 490 shown in FIG. 6 assumes:

predetermined time $t = L_t/V$ where, V is a reading linear velocity.

Each of the delay circuits 421, 422, 461, 462, and 490 is constructed by, for example, a group of D flip-flops of serial n stages, or an FIFO memory, or the like such that the predetermined time t is spent from the data input to the output.

In this case, when the read sampling value read out from the position $A_0$ on the recording track T is generated from the delay circuit 490 in FIG. 6, the sequences have the following read sampling values:

SA: read sampling value read out from the position $A_5$ on the recording track (T+1);

$SA_{d1}$: read sampling value read out from the position $A_6$ on the recording track (T+1);

$SA_{d2}$: read sampling value read out from the position $A_4$ on the recording track (T+1);

$SB_{d1}$: read sampling value read out from the position $A_0$ on the recording track T;

SC': read sampling value read out from the position $A_3$ on the recording track (T−1);

$SC_{d1}$: read sampling value read out from the position $A_1$ on the recording track (T−1); and $SC_{d2}$: read sampling value read out from the position $A_2$ on the recording track (T−1).

The filter coefficient computing circuit 401 and coefficient multiplier 411 in FIG. 6, therefore, obtain the crosstalk CR1 from the position $A_5$ to the position $A_0$ on the recording track T based on SA, namely, the read sampling value read out from the position $A_5$ on the recording track (T+1). The filter coefficient computing circuit 402 and coefficient multiplier 412 obtain the crosstalk CR2 from the position $A_6$ to the position $A_0$ on the recording track T based on $SA_{d1}$, namely, the read sampling value read out from the position $A_6$ on the recording track (T+1). The filter coefficient computing circuit 403 and coefficient multiplier 413 obtain the crosstalk CR3 from the position $A_4$ to the position $A_0$ on the recording track T based on $SA_{d2}$, namely, the read sampling value read out from the position $A_4$ on the recording track (T+1).

The adder 430 obtains the substantial total crosstalk $CR_{(T+1)}$ from the recording track (T+1) to the position $A_0$ on the recording track T by adding the crosstalks CR1 to CR3 from the positions $A_5$, $A_6$, and $A_4$ on the recording track (T+1) to the position $A_0$ on the recording track T.

The filter coefficient computing circuit 404 and coefficient multiplier 454 in FIG. 6, obtain the crosstalk CR4 from the position $A_3$ to the position $A_0$ on the recording track T based on SC', namely, the read sampling value read out from the position $A_3$ on the recording track (T−1). The filter coefficient computing circuit 405 and coefficient multiplier 455 obtain the crosstalk CR5 from the position $A_1$ to the position $A_0$ on the recording track T based on $SC_{d1}$, namely, the read sampling value read out from the position $A_1$ on the recording track (T−1). The filter coefficient computing circuit 406 and coefficient multiplier 456 obtain the crosstalk CR6 from the position $A_2$ to the position $A_0$ on the recording track T based on $SC_{d2}$, namely, the read sampling value read out from the position $A_2$ on the recording track (T−1).

The adder 470 obtains the substantial total crosstalk $CR_{(T-1)}$ from the recording track (T−1) to the position $A_0$ on the recording track T by adding the crosstalks CR4 to CR6 from the positions $A_3$, $A_1$, and $A_2$ on the recording track (T−1) to the position $A_0$ on the recording track T.

The subtractor 480 subtracts each of the total crosstalk $CR_{(T+1)}$ from the recording track (T+1) and the total crosstalk $CR_{(T-1)}$ from the recording track (T−1) as mentioned above from $SB_{d1}$, namely, the read sampling value read out from the position $A_0$ on the recording track T, thereby outputting the read sampling value sequence P in which the crosstalks were removed.

As mentioned above, in the crosstalk eliminating method according to the invention, first, the reading position ($A_0$) from the center recording track as an information reading target among the three recording tracks which are neighboring each other on the recording disk is considered as a reference. Subsequently, the crosstalk components (CR1 to CR6) are obtained based on the read signals read out from the positions ($A_2$ and $A_3$; $A_4$ and $A_5$) which are shifted by the predetermined distance ($L_t$) frontward and rearward respectively in the reading direction from the reading position ($A_0$) on the recording tracks which are adjacent on both sides of the center recording track and the read signals read out from the positions ($A_1$, $A_6$) near the reading position ($A_0$), respectively. By subtracting each of the crosstalk components from the read signal read out from the reading position ($A_0$) on the center recording track, the crosstalk components from the adjacent tracks are removed.

In this instance, the predetermined distance ($L_t$) corresponds to the position of the side lobe which is irradiated to either one of the recording tracks which are neighboring on both sides of the center recording track when the tilt occurs between the recording disk and the pickup and satisfies the following inequality.

$$\{(0.65 \times \lambda/NA)^2 - Tp^2\}^{1/2} < L_t < \{(\lambda/NA)^2 - Tp^2\}^{1/2}$$

where, $\lambda$ is a wavelength of reading beam, NA is a numerical aperture of the objective lens 106, and Tp is a pitch between the recording tracks.

Therefore, according to the above crosstalk eliminating method, even if a tilt occurs between the recording disk and the pickup, the crosstalks due to the influence by the tilt can effectively be removed.

Although the crosstalk eliminating circuit 40 in the embodiment simultaneously reads the three adjacent recording tracks by using three beams, the invention is not limited to this construction. In brief, any construction can be used so long as the signals of the three recording tracks can be obtained.

Each of the delay circuits 421, 422, 461, 462, and 490 shown in FIG. 6 can be constructed by, for example, an FIFO (First-in•First-out) memory or the like.

That is, the read sampling value sequences are sequentially input to the shift registers of n stages at the same sampling timings as those in the A/D converters 5a to 5c and are shifted one stage by one every timing of a predetermined reference clock signal, thereby giving the delay of:

predetermined time $t=L_t/V$ where, V is a reading linear velocity as mentioned above.

Figure 11:
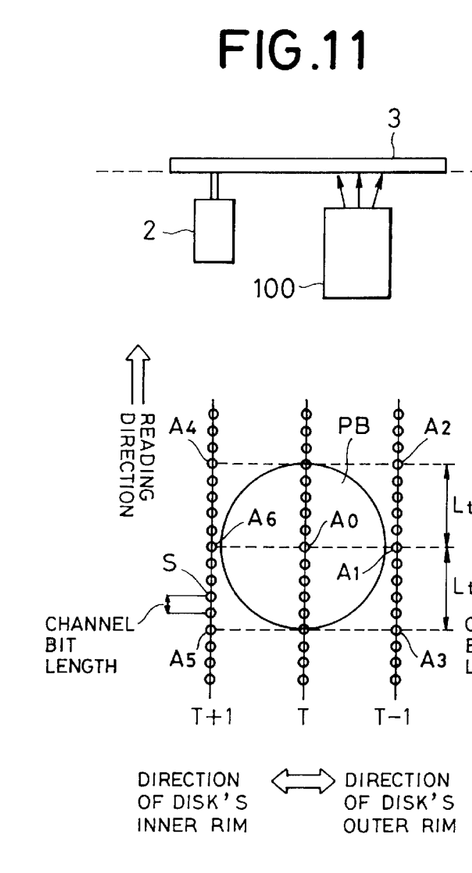
FIGS. 11 to 13 are diagrams showing examples of a sampling timing on the recording track in each state shown in FIGS. 8 to 10.
Figure 12:
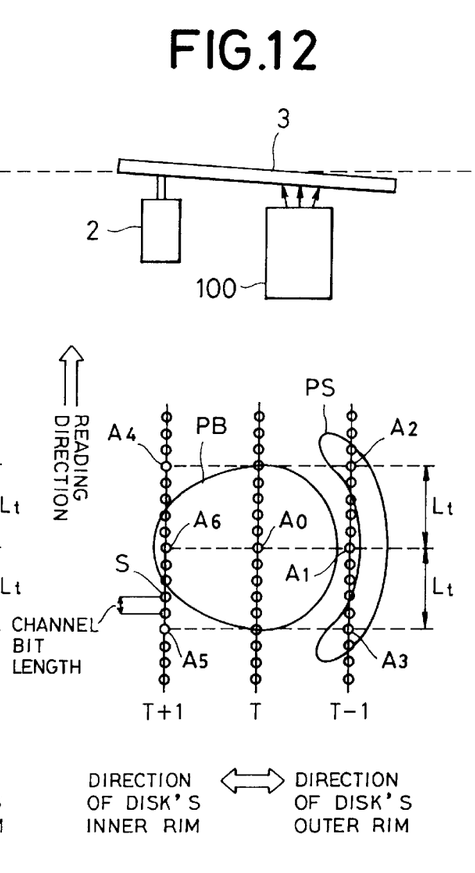
Figure 13:
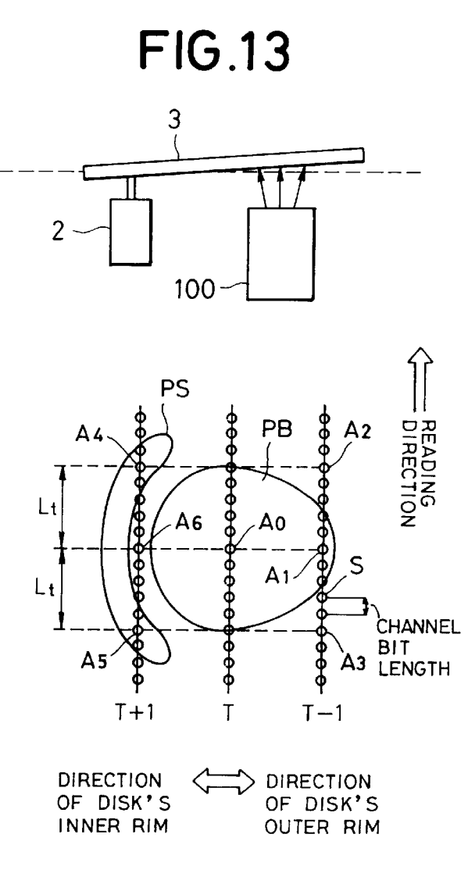

FIGS. 11 to 13 show examples of the sampling timings on the recording track in the states of FIGS. 8 to 10, respectively. In this instance, an interval between the sampling timing points shown by "S" in FIGS. 11 to 13 corresponds to a channel bit length in the FIFO memory.

That is, the number n of stages of the FIFO memories satisfies the following inequality:

$$\{(0.65 \times \lambda/NA)^2 - Tp^2\}^{1/2}/(V/fs) < n < \{(\lambda/NA)^2 - Tp^2\}^{1/2}/(V/fs)$$

where, $\lambda$ is wavelength of reading beam, NA is a numerical aperture of the objective lens 106, and Tp is a pitch between the recording tracks, and fs is a sampling frequency.

What is claimed is:

1. A crosstalk eliminating method in a recorded information reproducing apparatus having a pickup to obtain a read signal by photoelectrically converting reflection light when a reading beam is irradiated onto recording tracks formed on a recording disk, comprising the steps of:

employing a reading position of said pickup for the center recording track among three adjacent recording tracks as a reference;

obtaining crosstalk components based on a read signal read out from each of positions which are shifted by a predetermined distance frontward and rearward in the reading direction from said reading position on each of the recording tracks which are neighboring said center recording track on both sides thereof and a read signal read out from each position near said reading position on each of the recording tracks which are neighboring on both sides of said center recording track; and subtracting said crosstalk components from the read signal read out from said reading position on said center recording track, thereby eliminating the crosstalks from the adjacent tracks.

2. A method according to claim 1, wherein said predetermined distance satisfies the following relationship $$\{(0.65 \times \lambda/NA)^2 - Tp^2\}^{1/2} < \text{said predetermined distance} < \{(\lambda/NA)^2 - Tp^2\}^{1/2}$$

where, $\lambda$ is a wavelength of said reading beam, NA is a numerical aperture of an objective lens of said pickup, and Tp is a pitch between the recording tracks.

3. A method according to claim 1, wherein said position that is shifted by said predetermined distance is a position of a side lobe which is irradiated to either one of the recording tracks which are neighboring on both sides of said center recording track when a tilt occurs between said recording disk and said pickup.

4. A crosstalk eliminating method in a recorded information reproducing apparatus having a pickup to obtain a read signal by photoelectrically converting reflection light when a reading beam is irradiated onto recording tracks formed on a recording disk, comprising the steps of:

when a reading position by said pickup for the center recording track among three adjacent recording tracks is employed as a reference and a crosstalk eliminated read signal in which crosstalk components from the adjacent tracks are removed from the read signal read out from said reading position is obtained;

detecting an error value of a signal level in said crosstalk eliminated read signal;

obtaining a correlation value between said error value and a first read signal read out from each position that is shifted by a predetermined distance ahead in the reading direction from said reading position on each of the recording tracks which are neighboring on both sides of said center recording track and multiplying said first read signal by said correlation value, thereby obtaining a first crosstalk component;

obtaining a correlation value between said error value and a second read signal read out from each position near said reading position on each of the recording tracks which are neighboring on both sides of said center recording track and multiplying said second read signal by said correlation value, thereby obtaining a second crosstalk component;

obtaining a correlation value between said error value and a third read signal read out from each position which is shifted by a predetermined distance rearward in the reading direction from said reading position on each of the recording tracks which are neighboring on both sides of said center recording track and multiplying said third read signal by said correlation value, thereby obtaining a third crosstalk component; and subtracting each of said first, second, and third crosstalk components from the read signal read out from said reading position on said center recording track, thereby obtaining said crosstalk eliminated read signal.

5. A method according to claim 4, wherein said predetermined distance satisfies the following inequality $$\{(0.65 \times \lambda/NA)^2 - Tp^2\}^{1/2} < \text{said predetermined distance} < \{(\lambda/NA)^2 - Tp^2\}^{1/2}$$

where, $\lambda$ is a wavelength of said reading beam, NA is a numerical aperture of an objective lens of said pickup, and Tp is a pitch between the recording tracks.

6. A method according to claim 4, wherein said position that is shifted by said predetermined distance is a position of a side lobe which is irradiated to either one of the recording tracks which are neighboring on both sides of said center recording track when a tilt occurs between said recording disk and said pickup.

* * * * *